United States Patent
Liu et al.

(10) Patent No.: US 11,479,491 B2
(45) Date of Patent: Oct. 25, 2022

(54) INTEGRATED WASTEWATER TREATMENT APPARATUS AND METHOD

(71) Applicant: SUZHOU UNIVERSITY OF SCIENCE AND TECHNOLOGY, Suzhou (CN)

(72) Inventors: Feng Liu, Suzhou (CN); Feiyue Qian, Suzhou (CN); Yong Li, Suzhou (CN); Suqin Wang, Suzhou (CN); Jianhua Wu, Suzhou (CN)

(73) Assignee: SUZHOU UNIVERSITY OF SCIENCE AND TECHNOLOGY, Suzhou (CN)

( * ) Notice: Subject to any disclaimer, the term of this patent is extended or adjusted under 35 U.S.C. 154(b) by 0 days.

(21) Appl. No.: 17/454,562

(22) Filed: Nov. 11, 2021

(65) Prior Publication Data

US 2022/0081336 A1    Mar. 17, 2022

Related U.S. Application Data

(63) Continuation of application No. PCT/CN2021/072858, filed on Jan. 20, 2021.

(30) Foreign Application Priority Data

Nov. 27, 2019 (CN) .......................... 201911180123.7
Nov. 27, 2019 (CN) .......................... 201911180742.6

(51) Int. Cl.
*C02F 9/00* (2006.01)
*C02F 3/00* (2006.01)
(Continued)

(52) U.S. Cl.
CPC ............... *C02F 9/00* (2013.01); *C02F 3/006* (2013.01); *C02F 1/20* (2013.01); *C02F 3/2846* (2013.01);
(Continued)

(58) Field of Classification Search
CPC .... C02F 9/00; C02F 3/006; C02F 1/20; C02F 3/2846; C02F 3/303; C02F 3/305;
(Continued)

(56) References Cited

U.S. PATENT DOCUMENTS

| 11,339,067 B2 * | 5/2022 | Van Dijk ................. C02F 3/302 |
| 2017/0253515 A1 | 9/2017 | Reid |
| 2022/0081336 A1 * | 3/2022 | Liu ........................... C02F 9/00 |

FOREIGN PATENT DOCUMENTS

| CA | 2852492 A1 | 11/2014 |
| CN | 2846408 Y | 12/2006 |

(Continued)

OTHER PUBLICATIONS

PCT International Search Report & Written Opinion dated Mar. 30, 2021 corresponding to PCT International Application No. PCT/CN2021/072858.
(Continued)

*Primary Examiner* — Fred Prince
(74) *Attorney, Agent, or Firm* — Schmeiser, Olsen & Watts, LLP

(57) ABSTRACT

The present disclosure relates to an integrated wastewater treatment apparatus and method, the apparatus comprises a first reactor module, a second reactor module, a sedimentation module and a gas-liquid separation module, the first reactor module comprises a first reactor and an anoxic reaction zone, an aerobic reaction zone, a first gas-gathering pressurized layer, a first water inlet pipe and an aeration device; the second reactor module comprises a second reactor, a second water inlet pipe, an anaerobic reaction zone and a second gas-gathering pressurized layer; the sedimentation module comprises a third reactor and a water outlet pipe; the gas-liquid separation module comprises a gas-liquid separator, an exhaust pipe, a first riser pipe, a second riser pipe and a return pipe. The apparatus can give full play
(Continued)

to the advantages of the autotrophic biological denitrification process, meet the biochemical treatment requirements of wastewater with low C/N ratio.

20 Claims, 5 Drawing Sheets

(51) Int. Cl.
    *C02F 1/20* (2006.01)
    *C02F 3/28* (2006.01)
    *C02F 3/30* (2006.01)
    *C02F 3/34* (2006.01)
    *C02F 1/00* (2006.01)
    *C02F 101/16* (2006.01)

(52) U.S. Cl.
    CPC .............. *C02F 3/303* (2013.01); *C02F 3/305* (2013.01); *C02F 3/307* (2013.01); *C02F 3/341* (2013.01); *C02F 2001/007* (2013.01); *C02F 2101/16* (2013.01); *C02F 2209/02* (2013.01); *C02F 2209/06* (2013.01); *C02F 2209/14* (2013.01); *C02F 2209/22* (2013.01); *C02F 2209/40* (2013.01); *C02F 2209/44* (2013.01)

(58) Field of Classification Search
    CPC .... C02F 3/307; C02F 3/341; C02F 2001/007; C02F 2101/16; C02F 2209/02; C02F 2209/06; C02F 2209/14; C02F 2209/22; C02F 2209/40; C02F 2209/44
    USPC ........ 210/605, 615, 616, 617, 630, 259, 903
    See application file for complete search history.

(56) References Cited

FOREIGN PATENT DOCUMENTS

| | | |
|---|---|---|
| CN | 101045582 A | 10/2007 |
| CN | 201024125 Y | 2/2008 |
| CN | 100473616 C | 4/2009 |
| CN | 104003513 A | 8/2014 |
| CN | 104692525 A | 6/2015 |
| CN | 105668789 A | 6/2016 |
| CN | 205313177 U | 6/2016 |
| CN | 205313188 U | 6/2016 |
| CN | 106277327 A | 1/2017 |
| CN | 106630143 A | 5/2017 |
| CN | 208120821 U | 11/2018 |
| CN | 108928922 A | 12/2018 |
| CN | 109160605 A | 1/2019 |
| CN | 109896628 A | 6/2019 |
| CN | 110078303 A | 8/2019 |
| CN | 110436631 A | 11/2019 |
| CN | 110902945 A | 3/2020 |
| CN | 110902946 A | 3/2020 |
| CN | 207998487 U | 10/2020 |
| KR | 20020072360 A | 9/2002 |
| KR | 20190031013 A | 3/2019 |
| WO | WO 2012/071793 A1 * | 6/2012 |

OTHER PUBLICATIONS

First Office Action issued in Chinese Application No. 2019111801237; dated May 7, 2021; 28 pgs.
Second Office Action issued in Chinese Application No. 2019111801237; dated Jul. 9, 2021; 30pgs.
Search Report for Chinese Application No. 2019111801237; dated Apr. 29, 2021; 30pgs.
Grady, JRr., C.P. Leslie et al.; "Adaptation and Expansion of Biological Treatement of Wasetwater"; 2 nd Edition; Chemical Industry Press, Jan. 31, 2003; pp. 335-336.
International Search Report and Written Opinion issued in International Application No. PCT/CN2021/072858; dated Mar. 30, 2021; 22 pgs.
First Office Action issued in Chinese Application No. 2019111807426; dated Aug. 13, 2021; 21 pgs.
"Discharge Standard of Pollutants for Municipal Wastewater Treatment Plant" (National Standard GB 18918-2002), http://kjs.mep.gov.cn. (English abstract) Publication Date Unknown.

* cited by examiner

INTEGRATED WASTEWATER TREATMENT APPARATUS AND METHOD

RELATED APPLICATIONS

The present application is a U.S. Continuation Application of International Application Number PCT/CN2021/072858 filed Jan. 20, 2021, and claims priority to Chinese Application Numbers 201911180123.7, filed Nov. 27, 2019 and 201911180742.6, filed Nov. 27, 2019, the disclosures of which are hereby incorporated by reference herein in their entireties.

TECHNICAL FIELD OF THE INVENTION

The present disclosure belongs to the environmental protection technology field, specifically relates to an integrated wastewater treatment apparatus and method.

BACKGROUND OF THE INVENTION

At present, how to realize "energy self-sufficiency and material recycling" has become an important development direction in the field of wastewater treatment. Among the many solutions, the new A-B process created based on COD capture and autotrophic biological denitrification is considered to be a very practical technical route. Wherein, the A stage mainly realizes the enrichment (recovery) or conversion (methane production) of organic matter in the wastewater through physical and chemical methods or anaerobic biological treatment, and the B stage uses autotrophic biological denitrification with anaerobic ammonia oxidation as the core, to effectively remove nitrogen pollutants in the water under the conditions of low C/N ratio, low aeration energy consumption and low sludge output, creating conditions for the resource utilization of tail water.

In most industrial wastewater and municipal wastewater, nitrogen pollutants are mainly ammonium nitrogen or organic nitrogen, therefore, the most commonly used technical route of the B stage is the combined partial nitritation-anaerobic ammonia oxidation (PN/A) process, the reaction equations are as follows:

Nitritation reaction(completed by aerobic ammonia oxidizing bacteria):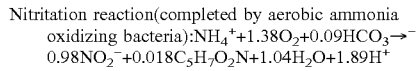
$NH_4^+ + 1.38O_2 + 0.09HCO_3^- \rightarrow 0.98NO_2^- + 0.018C_5H_7O_2N + 1.04H_2O + 1.89H^+$ Anaerobic ammonia oxidation reaction(completed by anammox bacteria):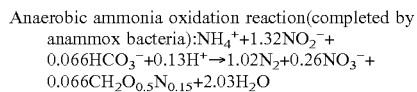
$NH_4^+ + 1.32NO_2^- + 0.066HCO_3^- + 0.13H^+ \rightarrow 1.02N_2 + 0.26NO_3^- + 0.066CH_2O_{0.5}N_{0.15} + 2.03H_2O$ PN/A total reaction: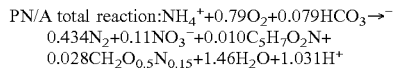
$NH_4^+ + 0.79O_2 + 0.079HCO_3^- \rightarrow 0.434N_2 + 0.11NO_3^- + 0.010C_5H_7O_2N + 0.028CH_2O_{0.5}N_{0.15} + 1.46H_2O + 1.031H^+$ Theoretically, the PN/A process will produce 0.434 mol of nitrogen and 0.11 mol of nitrate nitrogen for every 1 mol of ammonium nitrogen removed, that is, the highest total nitrogen removal rate is about 89%, in order to meet the increasingly stringent total nitrogen emission standards, denitrification treatment of the effluent of the PN/A process will help to further improve the overall nitrogen removal performance of the system. Due to the lack of carbon sources in the effluent, if it is wanted to remove this part of nitrate nitrogen through the conventional heterotrophic denitrification process, it can only adopt auxiliary methods such as adding additional carbon sources, which greatly increases the difficulty of system operation and the risk of effluent COD excessing the standard. On the other hand, when using two independent reactors to run the PN/A process, the nitritation reaction needs to consume a large amount of alkalinity, and when the alkalinity produced by the back-end anammox reaction cannot be used, it is necessary to additionally add alkalinity to the aerobic zone to maintain suitable conditions for the nitritation reaction.

If the denitrification is placed in the front of the continuous flow wastewater treatment system and an internal circulation system is added, and a new process of anoxic/aerobic/anaerobic (A/O/A) is established, the carbon source in the influent and the alkalinity of the effluent can be used to further reduce the total nitrogen content of the effluent of the system and reduce the operating cost. To achieve the above goals, it is necessary to eliminate the mutual interference between different units, organically combine anoxic, aerobic and anaerobic reaction units, couple denitrification, nitritation and anammox functions, and achieve flexible regulation of operating conditions.

The existing wastewater treatment reaction equipment and its control method cannot realize the operation of the A/O/A process, the reasons comprise: (1) It is difficult to achieve rapid conversion between anoxic/aerobic/anaerobic conditions using SBR and other sequencing batch reactors. In addition, in a single sludge type such as biofilm, flocculent sludge or granular sludge, it is impossible to simultaneously enrich functional bacteria with very different habitats such as denitrifying bacteria, aerobic ammonia oxidizing bacteria and anammox bacteria, and keep its structure stable; (2) If multiple continuous flow reactors are used to run the A/O/A process in a horizontal series connection, multiple water pumps must be installed (sometimes standby pumps are required), to meet the requirements of nitrification liquid reflux and alkalinity internal circulation (or additional alkalinity). This obviously increases the complexity and investment and operating costs of the system, and offsets the energy-saving advantages of using the autotrophic biological denitrification process. From a technical and economic point of view, the practical value of this method is very low; (3) When a vertical flow reactor (Chinese patent 201410274333.3) is used, with the help of the gas stripping effect with aeration oxygenation, the internal circulation of the aerobic reaction zone can be achieved without adding a water pump, but due to the lack of anoxic and anaerobic treatment functions, it cannot be used to run the A/O/A process. Considering that the tail gas of aeration has a strong inhibitory effect on the anoxic/anaerobic reaction, the aerobic zone cannot be placed at the front (lower) of the anaerobic zone. Therefore, the existing anaerobic (hypoxic)/aerobic functional zones (Chinese patents CN200710021101.7, CN201810794077.9) cannot achieve the function of autotrophic biological denitrification.

In short, how to innovate the configuration design of the reaction apparatus and its control method, and maximize the advantages of high efficiency and low consumption of the A/O/A process, has become the key to the innovation of biological denitrification treatment technology.

SUMMARY OF THE INVENTION

The technical problem to be solved by the present disclosure is to provide an integrated wastewater treatment apparatus and method that can give full play to the advantages of the autotrophic biological denitrification process, and have high treatment efficiency and low treatment energy consumption.

To solve the above technical problems, the present disclosure employs the following technical solution:

One aspect of the present disclosure provides an integrated wastewater treatment apparatus, comprising a first reactor module, a second reactor module of which a lower end is in communication with an upper end of the first reactor module, a sedimentation module of which a lower end is in communication with an upper end of the second reactor module, and a gas-liquid separation module, the first reactor module comprises a first reactor, an anoxic reaction zone located in the first reactor, a denitrification biological filler filled in the anoxic reaction zone, an aerobic reaction zone located in the first reactor and above the anoxic reaction zone, nitritation granular sludge filled in the aerobic reaction zone, a first gas-gathering pressurized layer located in the first reactor and above the aerobic reaction zone, a first water inlet pipe connected with the first reactor and in communication with the anoxic reaction zone, and an aeration device arranged in the aerobic reaction zone;

the second reactor module comprises a second reactor connected with the first reactor, a second water inlet pipe connected with a lower portion of the second reactor, an anaerobic reaction zone located in the second reactor, an anaerobic ammonium oxidation biological filler filled in the anaerobic reaction zone, and a second gas-gathering pressurized layer located in the second reactor and above the anaerobic reaction zone;

the sedimentation module comprises a third reactor connected with the second reactor, and a water outlet pipe connected to an upper portion of the third reactor;

the gas-liquid separation module comprises a gas-liquid separator, an exhaust pipe connected with an upper portion of the gas-liquid separator, a first riser pipe of which two ends are respectively in communication with the gas-liquid separator and the first gas-gathering pressurized layer, a second riser pipe of which two ends are respectively in communication with the gas-liquid separator and the second gas-gathering pressurized layer, and a return pipe of which two ends are respectively in communication with the gas-liquid separator and the anoxic reaction zone.

The apparatus of the present disclosure can give full play to the advantages of the autotrophic biological denitrification process, meet the biochemical treatment requirements of wastewater with low C/N ratio, have advantages such as high denitrification efficiency, low treatment energy consumption, avoiding additional chemicals, high space utilization, simple maintenance, etc.

According to some specific and preferred implementations, the bacterial community structure of the nitritation granular sludge is: aerobic ammonia oxidizing bacteria account for 10 to 50% of the total number of bacteria, nitrite oxidizing bacteria account for less than 2% of the total number of bacteria, and others are symbiotic bacteria related to the formation of the nitritation granular sludge.

According to some specific and preferred implementations, the nitritation granular sludge has a spherical shape with a particle size of 0.3 to 2 mm.

According to some specific and preferred implementations, the anaerobic ammonium oxidation biological filler has a biofilm thickness of 0.2 to 5 mm, and the bacterial community structure is: anammox bacteria account for 5 to 40% of the total number of bacteria, and others are symbiotic bacteria related to the formation of the biofilm.

According to some specific and preferred implementations, the first riser pipe passes through the sedimentation module and the second reactor module successively.

According to some specific and preferred implementations, the second riser pipe passes through the sedimentation module.

According to some specific and preferred implementations, the return pipe passes through the sedimentation module, the second reactor module, the first gas-gathering pressurized layer and the aerobic reaction zone successively.

By arranging the first riser pipe, the second riser pipe, and the return pipe inside the integrated wastewater treatment apparatus, the integrated wastewater treatment apparatus has a clean appearance, small size, and compact structure.

According to some specific and preferred implementations, the first reactor module further comprises a partition plate arranged between the anoxic reaction zone and the aerobic reaction zone for separating the anoxic reaction zone and the aerobic reaction zone into independent chambers, and a plurality of water distribution pipes arranged on the partition plate for communicating the anoxic reaction zone and the aerobic reaction zone, and the aeration device is mounted above the partition plate.

According to some specific and preferred implementations, the partition plate is connected with the first reactor capable of sliding along an up-and-down direction, and the first reactor module further comprises a lock mechanism capable of relatively fixing the partition plate and the first reactor.

According to some specific and preferred implementations, the partition plate is tapered with an apex angle facing upward, and the apex angle is 100 to 120°.

According to some specific and preferred implementations, the water distribution pipes are divided into 2 to 4 layers along the radial direction of the partition plate, and 4 to 8 water distribution pipes are evenly arranged on each layer, so that the effluent from the anoxic reaction zone can be more evenly passed into the bottom of the aerobic reaction zone.

Wherein, the partition plate has a conical shape, and the radial direction of the partition plate refers to the direction along the generatrix of the cone.

According to some specific and preferred implementations, the water outlets of the water distribution pipes face the inner wall of the first reactor, so as to prevent the nitritation granular sludge in the aerobic reaction zone from flowing back to the anaerobic reaction zone when the water distribution pipes do not discharge water.

According to some specific and preferred implementations, the aeration device comprises an aeration ring arranged at the connection between the first reactor and the partition plate, and a gas inlet pipe connected with the aeration ring and extending out of the first reactor.

According to some specific and preferred implementations, the volume of the anoxic reaction zone is 10 to 30% of the volume of the first reactor; the height of the first gas-gathering pressurized layer is 0.2 to 0.4 times the height of the first reactor and does not exceed 2.5 m; the height of the second gas-gathering pressurized layer is 0.2 to 0.4 times the height of the second reactor and does not exceed 2.5 m.

According to some specific and preferred implementations, the first gas-gathering pressurized layer comprises first gas-gathering areas located on two sides, and a first channel respectively connected to the first gas-gathering areas on the two sides, the first channel comprises first perforated plates respectively located on two sides and formed with a plurality of openings, and a first cover plate respectively connected to the upper ends of the two first perforated plates, and the first cover plate is opened with a first hole for the first riser pipe to pass through, and a second hole for the return pipe to pass through; the first gas-gathering areas comprises a plurality of first gas-gathering hoods of which two ends are respectively connected with the first perforated plates and the inner wall of the first reactor, the plurality of first gas-gathering hoods are divided into 3 to 6 layers staggered along the up and down direction, and on each layer is arranged multiple first gas-gathering hoods at intervals;

the second gas-gathering pressurized layer comprises second gas-gathering areas located on two sides, and a second channel respectively connected to the second gas-gathering areas on the two sides, the second channel comprises second perforated plates respectively located on two sides and formed with a plurality of openings, and a second cover plate respectively connected to the upper ends of the two second perforated plates, and the second cover plate is opened with a third hole for the first riser pipe to pass through, a fourth hole for the second riser pipe to pass through, and a fifth hole for the return pipe to pass through; the second gas-gathering areas comprises a plurality of second gas-gathering hoods of which two ends are respectively connected with the second perforated plates and the inner wall of the second reactor, the plurality of second gas-gathering hoods are divided into 3 to 6 layers staggered along the up and down direction, and on each layer is arranged multiple second gas-gathering hoods at intervals.

According to some specific and preferred implementations, the width of the first channel is 0.1 to 0.2 times the diameter of the first gas-gathering pressurized layer, and the width of the second channel is 0.1 to 0.2 times the diameter of the second gas-gathering pressurized layer.

According to some specific and preferred implementations, the second reactor module comprises a support plate arranged in the second reactor and located above the second water inlet pipe, and a mesh cover arranged in the second reactor and located under the second gas-gathering pressurized layer, between the support plate and the mesh cover is formed the anaerobic reaction zone, and the support plate is opened with a sixth hole for the first riser pipe to pass through, and a seventh hole for the return pipe to pass through, and a plurality of water distribution holes.

According to some specific and preferred implementations, the filling volume of the anammox biological filler is 70% to 80% of the volume of the second reactor, and the anammox biological filler is a diagonally suspended porous suspended filler (MBBR filler).

According to some specific and preferred implementations, the height-to-diameter ratio of the first reactor and the second reactor is independently 1 to 3:1.

According to some specific and preferred implementations, the aerobic reaction zone is provided with DO, pH and temperature online monitoring probes.

According to some specific and preferred implementations, the first riser pipe and the second riser pipe respectively comprise a first pipe section extending in an up-down direction, and a second pipe section extending upward from the first pipe section toward the gas-liquid separator, and the angle between the second pipe section and the horizontal plane is 3° to 5°.

According to some specific and preferred implementations, the gas-liquid separation module further comprises solenoid valves respectively arranged on the first riser pipe and the second riser pipe and located above the sedimentation module, and a flow meter arranged on the return pipe.

According to some specific and preferred implementations, the inner diameters of the first riser pipe and the second riser pipe are independently 0.01 to 0.05 times the inner diameter of the first reactor, and the inner diameters of the first reactor, the second reactor and the third reactor are the same, and the inner diameter of the return pipe is 1.2 to 2 times the inner diameter of the first riser pipe.

Another aspect of the present disclosure provides an integrated wastewater treatment method, and the integrated wastewater treatment method adopts an integrated wastewater treatment apparatus to treat wastewater to be treated;

the integrated wastewater treatment apparatus, comprises a first reactor module, a second reactor module of which a lower end is in communication with an upper end of the first reactor module, a sedimentation module of which a lower end is in communication with an upper end of the second reactor module, and a gas-liquid separation module;

the first reactor module comprises a first reactor, an anoxic reaction zone located in the first reactor, a denitrification biological filler filled in the anoxic reaction zone, an aerobic reaction zone located in the first reactor and above the anoxic reaction zone, nitritation granular sludge filled in the aerobic reaction zone, a first gas-gathering pressurized layer located in the first reactor and above the aerobic reaction zone, a first water inlet pipe connected with the first reactor and in communication with the anoxic reaction zone, and an aeration device arranged in the aerobic reaction zone; the bacterial community structure of the nitritation granular sludge is: aerobic ammonia oxidizing bacteria account for 10 to 50% of the total number of bacteria, nitrite oxidizing bacteria account for less than 2% of the total number of bacteria, and others are symbiotic bacteria related to the formation of the nitritation granular sludge;

the second reactor module comprises a second reactor connected with the first reactor, a second water inlet pipe connected with a lower portion of the second reactor, an anaerobic reaction zone located in the second reactor, an anammox biological filler filled in the anaerobic reaction zone, and a second gas-gathering pressurized layer located in the second reactor and above the anaerobic reaction zone; the anammox biological filler has a biofilm thickness of 0.2 to 5 mm, and the bacterial community structure is: anammox bacteria account for 5 to 40% of the total number of bacteria, and others are symbiotic bacteria related to the formation of the biofilm;

the sedimentation module comprises a third reactor connected with the second reactor, and a water outlet pipe connected to an upper portion of the third reactor;

the gas-liquid separation module comprises a gas-liquid separator, an exhaust pipe connected with an upper portion of the gas-liquid separator, a first riser pipe of which two ends are respectively in communication with the gas-liquid separator and the first gas-gathering pressurized layer and which passes through the sedimentation module and the second reactor module successively, a second riser pipe of which two ends are respectively in communication with the gas-liquid separator and the second gas-gathering pressurized layer and which passes through the sedimentation module, and a return pipe of which two ends are respectively in communication with a lower portion of the gas-liquid separator and the anoxic reaction zone and which passes through the sedimentation module, the second reactor module, the first gas-gathering pressurized layer and the aerobic reaction zone successively;

passing 55% to 65% of the wastewater to be treated into the anoxic reaction zone through the first water inlet pipe, passing 35% to 45% of the wastewater to be treated into the bottom of the second reactor through the second water inlet pipe, controlling the flow rate of the gas-water mixture in the first riser pipe and the second riser pipe to independently be 2 to 10 m/s, controlling the hydraulic retention time in the third reaction to be 0.5 to 1.5 h, and controlling the flow rate of the return pipe is to be 1 to 8 times the total water inflow rate of the first water inlet pipe and the second water inlet pipe; controlling the ammonium nitrogen concentration of the effluent from the aerobic reaction zone of the first reactor to be not less than 1 mg/L, the dissolved oxygen concentration to be not higher than 0.3 times the ammonium nitrogen concentration, the pH at room temperature to be 7.0 to 7.6, and the free nitrous acid concentration to be not less than 0.01 mg/L.

In the present disclosure, those skilled in the art can adjust the inlet water flow rate, the aeration intensity, the opening degree of the solenoid valve, etc. through known techniques, so that the water quality of the effluent from the aerobic reaction zone meets the requirements of the present disclosure.

The integrated wastewater treatment apparatus adopted by the integrated wastewater treatment method in the present disclosure is the integrated wastewater treatment apparatus described in the first aspect.

According to some specific and preferred implementations, the flow rate of the water distribution pipes is controlled to be 1 to 3 m/s.

In the present disclosure, a concentration ratio of easily biodegradable organic matter to ammonium nitrogen of the wastewater to be treated is <2:1, and the ammonium nitrogen concentration in the wastewater to be treated is 90% or more of the total nitrogen concentration.

Further, the wastewater to be treated is the pretreatment effluent from the anaerobic biochemical reactor in which the nitrogen pollutants are dominated by ammonium nitrogen, with the concentration ratio of the fast biodegradable organic matter to the ammonium nitrogen ($BCOD/NH_4^+-N$)<2:1.

The FNA calculation formula in the present disclosure is as follows:

$$FNA(mg/L) = \frac{46}{14} \times \frac{NO_2^- - N}{\exp[-2300/(273+T)] \times 10^{pH}}$$

wherein, $NO_2^-$—N is the concentration of nitrite nitrogen, mg/L; T is the temperature, ° C.; pH is the pH of the solution.

The ammonium nitrogen concentration, the total nitrogen concentration and the dissolved oxygen concentration were measured by Nessler's reagent spectrophotometry (HJ 535-2009), alkaline potassium persulfate digestion-ultraviolet spectrophotometry (GB11894-89) and the standard electrode method, respectively. The BCOD concentration is the decrease in COD concentration of the influent water after inoculating a small amount of municipal wastewater supernatant and incubating for 5 d under aerobic conditions at 20° C., and the COD concentration was measured by the Dichromate method (HJ 828-2017).

Due to the implementation of the above technical solution, the present disclosure has the following advantages over the prior art:

By improving the overall structure of the apparatus, the present disclosure avoids the negative influence of the aeration of the aerobic reaction zone on the anaerobic reaction zone located above, and realizes the coupling of denitrification, nitritation and anaerobic ammonia oxidation functions.

The present disclosure makes full use of the tail gas of aeration and the gas produced by reaction as the internal circulation power of the solution, the internal reflux ratio can reach 8 to 10 times, and the energy consumption is far better than the pump reflux of the traditional A/O process. In addition, the present disclosure uses the internal circulation to put denitrification in front, which can not only reduce the easily biodegradable organic matter in the influent water and prevent the growth of heterotrophic bacteria in the aerobic reaction zone, but also can effectively reduce the concentration of nitrate nitrogen in the effluent. In addition, the internal circulation makes full use of the alkalinity generated in the anaerobic/anoxic reaction zone, which is beneficial to maintaining the optimal conditions for the nitritation reaction and reducing additional chemicals.

The present disclosure adopts a vertical flow design, which makes the floor area much smaller than a horizontal flow system, and the modular design of the apparatus is beneficial to mass production and cost reduction, the power equipment of the apparatus is externally installed without any moving machine inside, and daily maintenance is simple and convenient.

Through the control of the apparatus structure and the method, the present disclosure can stably operate the combined process of denitrification-nitritation-anammox, thereby forming a relatively stable functional flora with high biomass, which is beneficial to improve the denitrification performance, reduce the volume of the apparatus, and have strong water quality adaptability and impact resistance.

DETAILED DESCRIPTION OF EXEMPLARY EMBODIMENTS

In the following, the present disclosure is further explained in detail combining with the accompanying drawings and specific embodiments, but the present disclosure is not limited to the following embodiments. When the specific experimental method is not indicated in the embodiments, it shall be carried out in accordance with the national standard methods and conditions.

Embodiment 1

The specific parameter settings of the processing apparatus used in this embodiment were as follows:

Water to be treated: effluent of leachate from a landfill treated by a 2-stage upflow anaerobic sludge bed (UASB) reactor, with a BCOD concentration of 330 to 480 mg/L, an ammonium nitrogen concentration of 400 to 500 mg/L, ammonium nitrogen accounting for more than 95% of the total nitrogen concentration, and a treatment scale of about 800 m$^3$/d.

Figure 1:
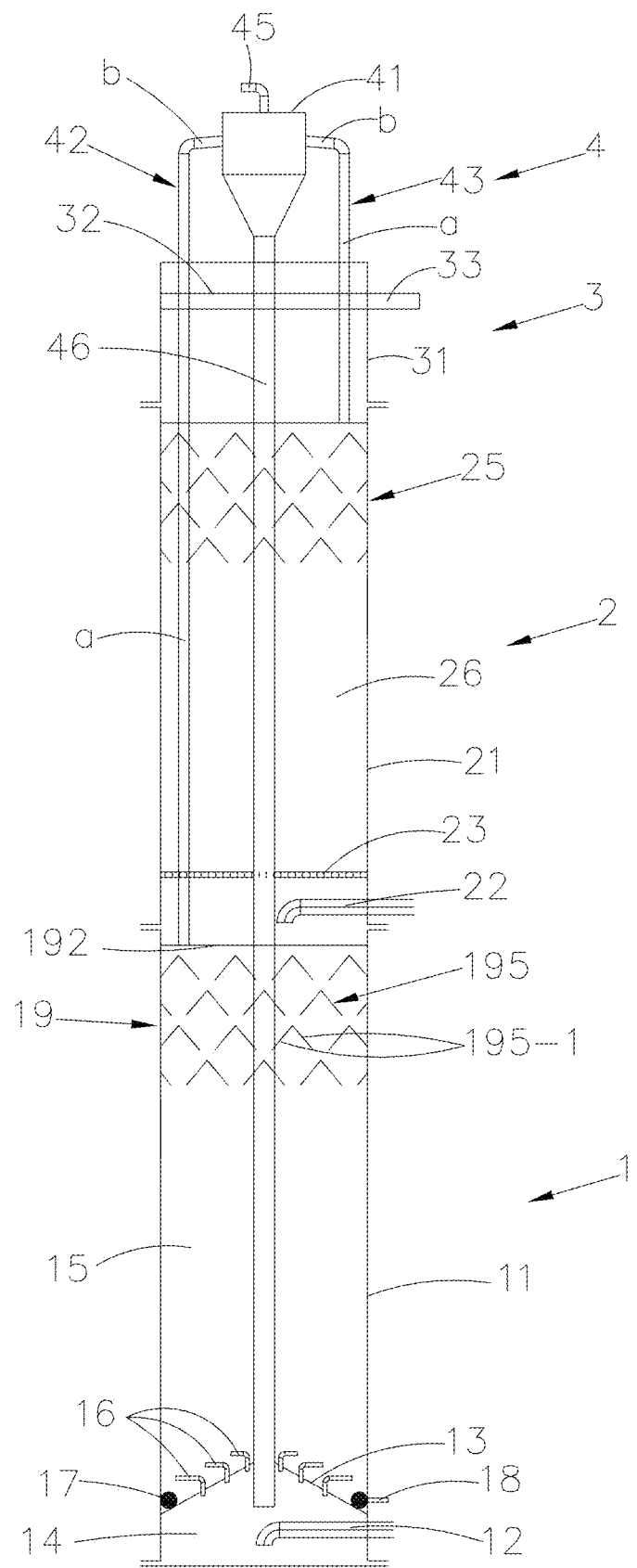
FIG. 1 is a schematic structure diagram of an integrated wastewater treatment apparatus according to a specific implementation.

As shown in FIG. 1, an integrated processing apparatus, is composed of a stacked combination of two reactor modules (a first reactor module 1 and a second reactor module 2), one sedimentation module 3 and one gas-liquid separation module 4, in which the first reactor module 1 comprises a first reactor 11, the second reactor module 2 comprises a second reactor 21, the sedimentation module 3 comprises a third reactor 31, the first reactor 11, the second reactor 21 and the third reactor 31 are stacked and connected from bottom to top to form a cylinder with a cross-sectional inner diameter of about 6 m and a height of about 18 m.

The first reactor module 1:

The first reactor 11 has a cross-sectional inner diameter of about 6 m and a height of about 8 m, the first water inlet pipe 12 is connected to the bottom of the first reactor 11 and is a bent pipe with a downward water outlet, about 60% of the water to be treated comes from the first water inlet pipe 12 and the hydraulic retention time in the first reactor 11 is about 11.3 h (calculated based on 60% of the inlet flow).

Figure 6:
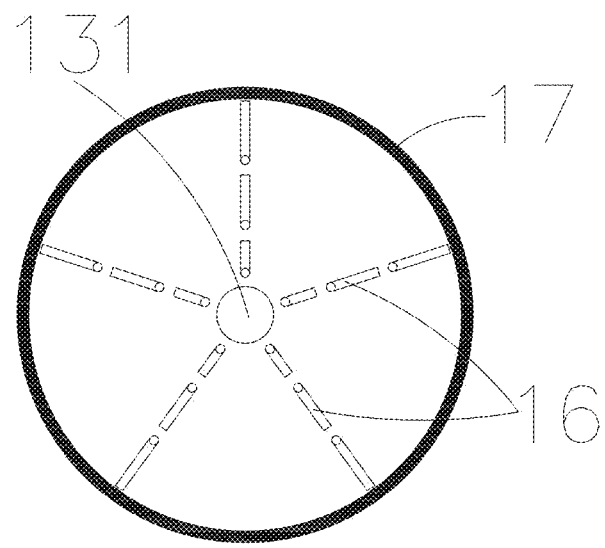
FIG. 6 is a top view of a partition plate, a water distribution pipe and an aeration ring of Embodiment 1.
Figure 7:
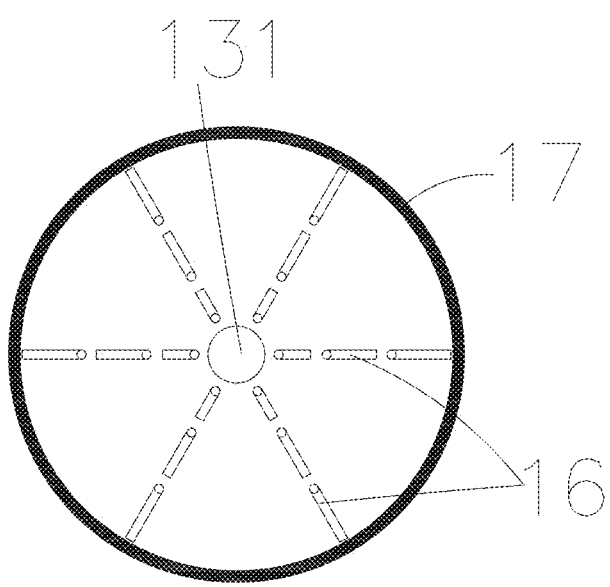
FIG. 7 is a top view of a partition plate, a water distribution pipe and an aeration ring of Embodiment 2.

As shown in FIG. 1 and FIG. 6, the first reactor 11 is provided with a partition plate 13 therein which is located above the first water inlet pipe 12 and divides the first reactor 11 into a lower anoxic reaction zone 14 and an upper aerobic reaction zone 15. The partition plate 13 is slidably connected to the inner wall of the first reactor 11 so that the volume of the anoxic reaction zone 14 can be adjusted by adjusting the distance between the partition plate 13 and the bottom of the first reactor 11, and between the partition plate 13 and the first reactor 11 is provided a lock mechanism capable of locking the two at relative positions, in addition, the partition plate 13 and the inner wall of the first reactor 11 are relatively sealed, so that the effluent from the anoxic reaction zone 14 cannot pass through the connection between the partition plate 13 and the inner wall of the first reactor 11 to permeate into the aerobic reaction zone 15, wherein the lock mechanism is not the focus of the protection of the present disclosure, as long as the lock mechanism that locks the positions of the two relative to each other can be realized. The partition plate 13 is in the shape of a cone with the apex angle facing upward and an apex angle of about 120°.

15 water distribution pipes 16 are arranged on the partition plate 13 and the 15 water distribution pipes 16 are divided into 3 layers, with 5 in each layer, the inner diameter of these water distribution pipes 16 is about 50 mm, and the flow velocity in the pipes is about 1.5 to 2.1 m/s; the water outlet of the water distribution pipes 16 faces the inner wall of the first reactor 11.

The aeration device comprises an aeration ring 17 arranged above the junction of the first reactor 11 and the partition plate 13, and a gas inlet pipe 18 connected with the aeration ring 17 and extending out of the first reactor 11.

The center of the partition plate 13 is provided with a through hole 131 for a return pipe 46 to pass through, the first water inlet pipe 12 is located below the return pipe 46, and, the water outlet of the first water inlet pipe 12 is located directly below the water outlet of the return pipe 46.

The volume of the anoxic reaction zone 14 is about 25% of the volume of the first reactor 11, and filled with spherical suspended fillers as denitrification biological fillers.

The aerobic reaction zone 15 is filled with nitritation granular sludge, the nitritation granular sludge has a concentration of 6000 to 7000 mg/L, a particle size of 0.5 to 1.6 mm, and a bacterial community structure in which aerobic ammonia oxidizing bacteria (Nitrosomonas) account for about 37%, nitrite oxidizing bacteria (Nitrolancea) account for about 1.3%, and symbiotic bacteria related to the formation of granular sludge (mainly Flavobacteriia, Sphingobacteria and Bacteroidetes) account for about 61.7%.

Figure 4:
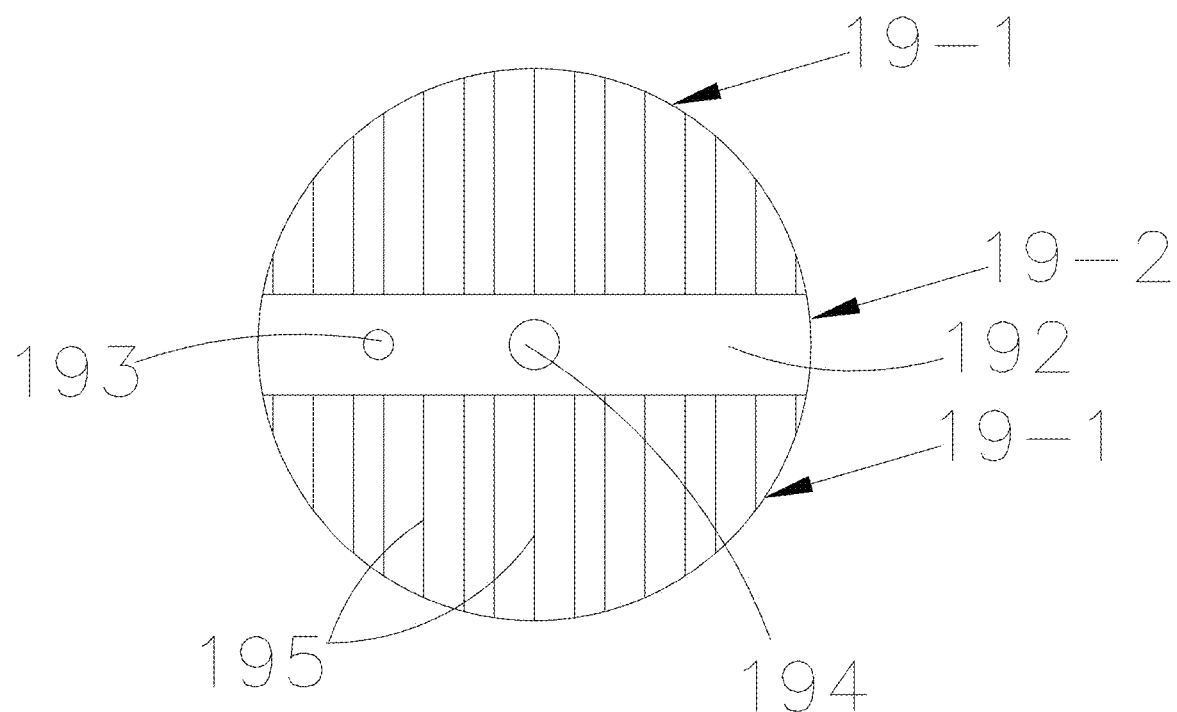
FIG. 4 is a top view of a first gas-gathering pressurized layer according to a specific implementation.
Figure 5:
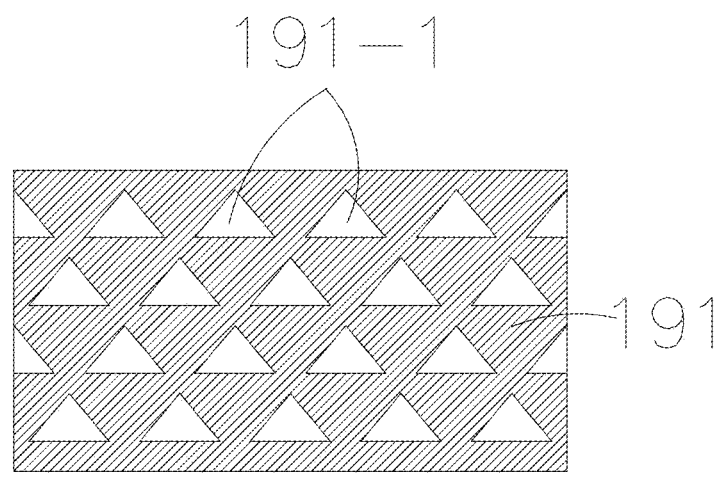
FIG. 5 is a front view of a perforated plate according to a specific implementation.

As shown in FIGS. 1, 4 and 5, the first gas-gathering pressurized layer 19 has a height of about 2 m, and comprises first gas-gathering areas 19-1 located on both sides and symmetrically arranged, and a first channel 19-2 respectively connected to the first gas-gathering areas 19-1 on both sides. The first channel 19-2 has a length of about 6 m and a width of about 1.2 m, and the first channel 19-2 comprises first perforated plates 191 on both sides and formed with a plurality of openings 191-1, and a first cover plate 192 respectively connected to the upper ends of the two first perforated plates 191, so that the first channel 19-2 is sealed above and opened at the bottom, the first cover plate 192 is provided with a first hole 193 for the first riser pipe 42 to pass through, and a second hole 194 for the return pipe 46 to pass through; the first gas-gathering areas 19-1 comprise a plurality of first gas-gathering hoods 195 of which two end portions are respectively connected to the first perforated plates 191 and the inner wall of the first reactor 11, the first gas-gathering hoods 195 are formed by connecting two long plates 195-1 at the upper end portions to form an inverted triangle shape, and the shape of the first gas-gathering hoods 195 matches the shape of the opening 191-1 on the first perforated plates 191. The plurality of first gas-gathering hoods 195 are divided into 4 layers staggered along the up-down direction, and multiple first gas-gathering hoods 195 are arranged at intervals on each layer, so that water can flow between two adjacent gas-gathering hoods, however, part of the gas is intercepted by the first layer of gas-gathering hood, and the gas passing through two adjacent gas-gathering hoods will be intercepted by the second layer of gas-gathering hood, thereby minimizing the gas entering the second reactor 21; when the effluent and gas from the aerobic reaction zone 15 enters the first gas-gathering pressurized layer 19, part of the effluent flows tortuously along the first gas-gathering hoods 195 and then enters the second reactor 21, and the remaining part of the effluent and gas enters the first channel 19-2 through the opening of the perforated plates after being collected by the gas-gathering hoods, and then enters the gas-liquid separator 41 through the first riser pipe 42.

In order to facilitate daily maintenance, the first reactor module 1 needs to be provided with mud pipes, manholes, emptying pipes, pH, DO and temperature online monitoring probes, etc., wherein the pH, DO and temperature online monitoring probes can be three separate probes, or a probe with these three functions integrated.

The second reactor module 2:

The size of the second reactor 21 is the same as that of the first reactor 11, and the hydraulic retention time in the second reactor 21 is about 6.8 h (calculated based on 100% of the inlet flow).

The second water inlet pipe 22 is connected to the bottom of the second reactor 21 and is a bent pipe with a downward water outlet, 40% of the water to be treated enters the second reactor 21 through the second water inlet pipe 22.

Figure 8:
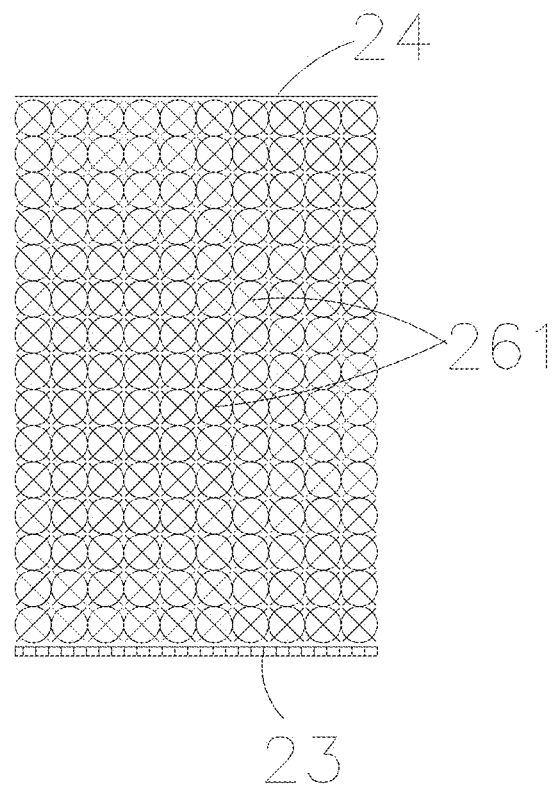
FIG. 8 is a front view of a support plate, an anammox biological filler, and a mesh cover according to a specific implementation.
Figure 9:
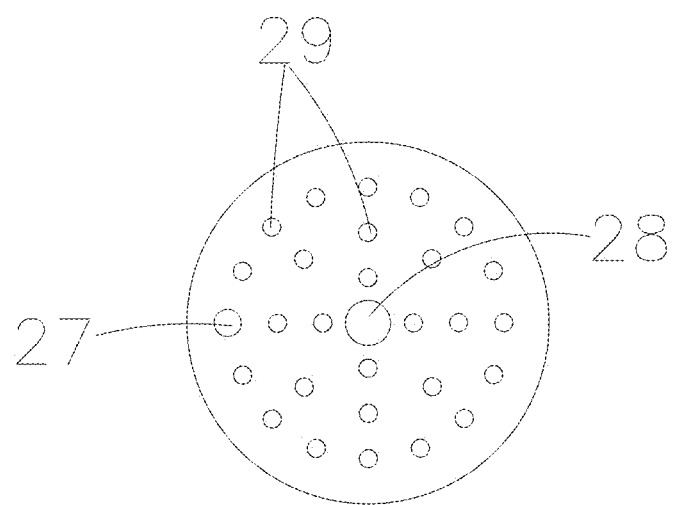
FIG. 9 is a top view of a support plate according to a specific implementation; wherein, 1, first reactor module; 2, second reactor module; 3, sedimentation module; 4, gas-liquid separation module; 11, first reactor; 12, first water inlet pipe; 13, partition plate; 131, through hole; 14, anoxic reaction zone; 15, aerobic reaction zone; 16, water distribution pipe; 17, aeration ring; 18, gas inlet pipe; 19, first gas-gathering pressurized layer; 19-1, first gas-gathering area; 19-2, first channel; 191, first perforated plate; 191-1, opening; 192, first cover plate; 193, first hole; 194, second hole; 195, first gas-gathering hood; 195-1, long plate; 21, second reactor; 22, second water inlet pipe; 23, support plate; 24, mesh cover; 25, second gas-gathering pressurized layer; 26, anaerobic reaction zone; 261, anammox biological filler; 27, sixth hole; 28, seventh hole; 29, water distribution hole; 31, third reactor; 32, water collection pipe; 33, water outlet pipe; 41, gas-liquid separator; 42, first riser pipe; 43, second riser pipe; a, first pipe section; b, second pipe section; 44, solenoid valve; 45, exhaust pipe; 46, return pipe; 47, flow meter.

As shown in FIGS. 8 and 9, the second reactor 21 is provided with a support plate 23 therein, and the support plate 23 is located above the second water inlet pipe 22. A mesh cover 24 is provided in the second reactor 21, and the mesh cover 24 is located above the support plate 23 and below the second gas-gathering pressurized layer 25, and the material of the mesh cover 24 is stainless steel. An anaerobic reaction zone 26 is formed between the support plate 23 and the mesh cover 24. The support plate 23 is opened with a sixth hole 27 for the first riser pipe 42 to pass through, a seventh hole 28 formed in the middle for the return pipe 46 to pass through, and a plurality of water distribution holes 29, the effluent from the first reactor 11 and the influent of the second water inlet pipe 22 uniformly flow into the anaerobic reaction zone 26 through the water distribution holes 29 of the support plate 23.

The anaerobic reaction zone 26 is filled with anammox biological filler 261, the filling volume of the anammox biological filler 261 is about 80% of the volume of the second reactor 21, the anammox biological filler 261 is MBBR filler, and the MBBR filler is cylindrical and has a cross-section diameter of about 25 mm and a height of about 8 mm; the thickness of the biofilm is about 0.8 to 3.2 mm, and the bacterial community structure is anammox bacteria (Candidatus Brocadia and Kuenenia) accounting for about 28%, and symbiotic bacteria related to the formation of biofilm (mainly Chloroflexi, Chlorobi, Anaerolineae and Sphingobacteria) accounting for about 72%.

The structure and size of the second gas-gathering pressurized layer 25 are substantially the same as those of the first gas-gathering pressurized layer 19, differing by that: the second cover plate is provided with a hole for the second riser pipe 43 to pass through, so the second gas-gathering pressurized layer 25 will not be repeated here.

In order to facilitate daily maintenance, the second reactor module 2 should be provided with a manhole at least.

The sedimentation module 3:

The inner diameter of the third reactor 31 is about 6 m, the effective water depth is about 1.8 m, and the hydraulic retention time is about 1.5 h; the upper portion of the third reactor 31 is provided with a water collecting pipe 32 with through holes, and the water collecting pipe 32 is in communication with the water outlet pipe 33 for discharge the treated water.

Figure 2:
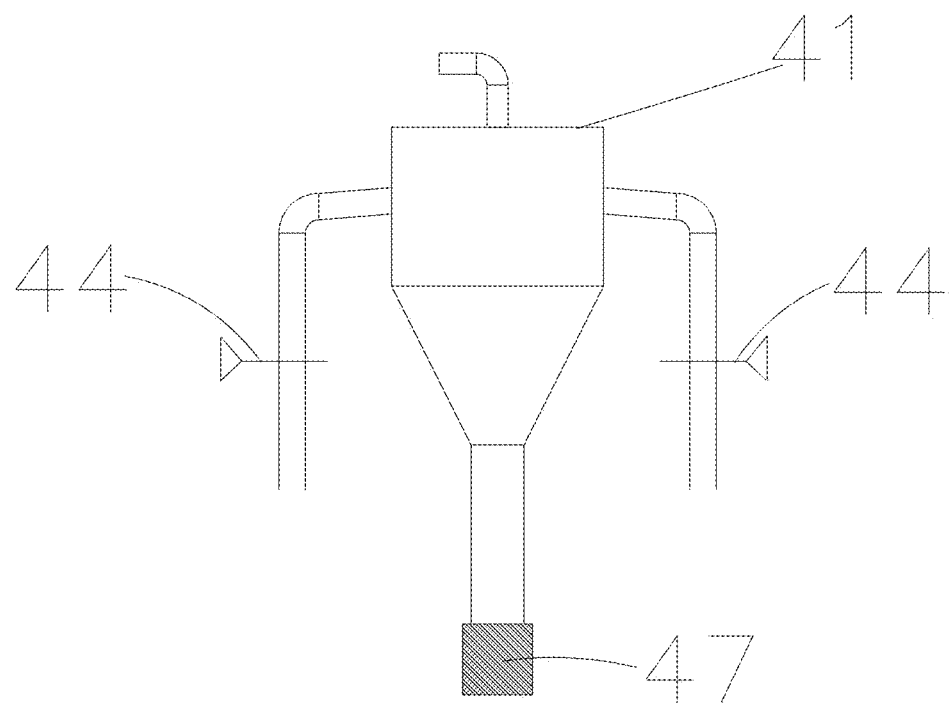
FIG. 2 is a partial structure diagram of a gas-liquid separation module according to a specific implementation.
Figure 3:
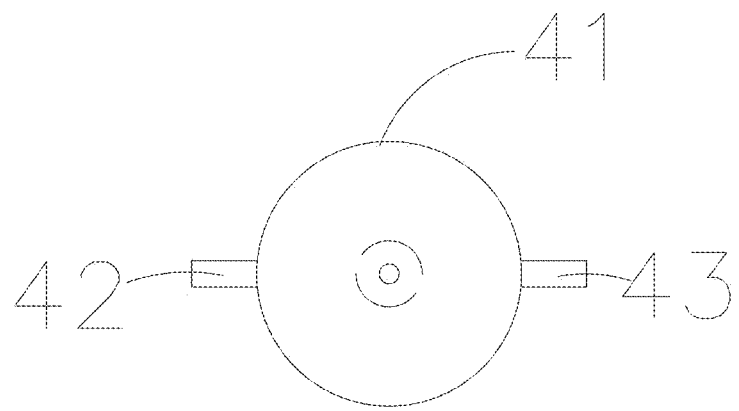
FIG. 3 is a top view of a gas-liquid separation module according to a specific implementation.

The gas-liquid separation module 4:

As shown in FIGS. 1 to 3,

The gas-liquid separator 41 is located above the sedimentation module 3, and its upper portion is a cylindrical cylinder, and the lower portion is an inverted funnel-shaped cyclone, the height of the cylinder is the same as the height of the cyclone, the inner diameter of the cylinder is about 0.8 m, and the overall height of the gas-liquid separator 41 is about 1.6 m.

The two sides of the cylinder of the gas-liquid separator 41 are respectively connected to the first riser pipe 42 and the second riser pipe 43, the first riser pipe 42 and the second riser pipe 43 respectively comprise a first pipe section a extending in the vertical direction and a second pipe section b extending upward from the first pipe section a toward the gas-liquid separator 41, the angle between the second pipe section b and the horizontal plane is about 5°, the inner diameters of the first riser pipe 42 and the second riser pipe 43 are both 100 mm, the first riser pipe 42 and the second riser pipe 43 are respectively provided with a solenoid valve 44, and the solenoid valves 44 are provided above the water surface line of the third reactor 31.

An exhaust pipe 45 is provided at the top of the cylinder, and its inner diameter is about 100 mm.

The bottom of the cyclone is connected with the return pipe 46 with an inner diameter of about 200 mm, the return pipe 46 is provided with a flow meter 47, which is located 1.5 m below the cyclone.

Under the condition of water temperature of 25 to 27° C., by adjusting the aeration intensity of the aerobic reaction zone 15 and the solenoid valves 44 on the riser pipes, the return flow of the return pipe 46 (reading of the flow meter 47) is controlled 4 to 6 times the total water inlet flow of the apparatus (that is, the sum of the water inlet flow rate of the first water inlet pipe 12 and the water inlet flow rate of the second water inlet pipe 22), so as to control the residual ammonium nitrogen concentration of the effluent from the aerobic reaction zone 15 of the first reactor 11 to be about 1.8 to 3.0 mg/L, the dissolved oxygen concentration to be about 0.4 to 0.7 mg/L, the pH in solution to be about 7.4 to 7.6, and the free nitrous acid (FNA) concentration to be about 0.03 to 0.07 mg/L.

The specific treatment steps are as follows: about 60% of the wastewater to be treated enters the anoxic reaction zone 14 through the first water inlet pipe 12, and the return pipe 46 conveys the return liquid to the anoxic reaction zone 14, a mixed liquid of the wastewater to be treated and the return liquid is in full contact with the denitrification biological filler at the oxygen reaction zone 14 to remove nitrates and easily biodegradable organic matter; the effluent and gaseous products from the anoxic reaction zone 14 enter the aerobic reaction zone 15 through the water distribution pipes 16 on the partition plate 13, the nitritation granular sludge is in a completely fluidized state under aeration, and is fully mixed with water to undergo nitritation, and the ammonium nitrogen volume load in the aerobic reaction zone 15 is about 1.4 to 1.8 kg $NH_4^+$-$N/(m^3 \cdot d)$; the effluent and all the gas from the aerobic reaction zone 15 enter the first gas-gathering pressurized layer 19, part of the effluent flows tortuously around the first gas-gathering hoods 195 into the second reactor 21, and the remaining part of the effluent and gas are collected by the first gas-gathering hoods 195 and then enters the first channel 19-2 through the first perforated plates 191; when the gas pressure is large enough, the gas-water mixture in the first channel 19-2 enters the gas-liquid separator 41 through the first riser pipe 42, the gas-water mixture rises at a flow rate of about 4 to 7 m/s, the gas is discharged upward through the exhaust pipe 45, and the water enters the cyclone downward, and returns to the anoxic reaction zone 14 at the bottom of the first reactor module 1 through the return pipe 46; the remaining 40% of the wastewater to be treated enters the second reactor 21 through the second water inlet pipe 22, is mixed with the effluent from the first reactor 11, passes through the water distribution holes 29 of the support plate 23, and fully contacts with the anammox biological filler 261 to remove total nitrogen in water, and the total nitrogen volume load in the zone of the anammox biological filler 261 is 2.4 to 2.9 kg $TN/(m^3 \cdot d)$; the effluent and gas from the anaerobic reaction zone 26 enter the second gas-gathering pressurized layer 25, part of the effluent flows tortuously around the second gas-gathering hoods into the third reactor 31, and is finally discharged from the water collecting device and the water outlet pipe 33; the remaining part of the effluent and gas are collected by the second gas-gathering hoods and then passes through the second perforated plate enters the second channel; when the gas pressure is large enough, the gas-water mixture in the second channel enters the gas-liquid separator 41 through the second riser pipe 43, and the gas-water mixture rises at a flow rate of about 3 to 3.5 m/s, and the gas is discharged upward through the exhaust pipe 45, and the water enters the cyclone downwards, and returns to the anoxic reaction zone 14 at the bottom of the first reactor module 1 through the return pipe 46.

The results of Embodiment 1 show that the concentrations of $BOD_5$, ammonium nitrogen and total nitrogen in the effluent of the apparatus can be stably below 20 mg/L, 10 mg/L and 30 mg/L, and the water quality is better than the secondary standard in "Discharge standard of pollutants for municipal wastewater treatment plant" (GB18918-2002).

Embodiment 2

Water to be treated: effluent of a municipal wastewater pretreated by a 2-stage anaerobic baffle reactor (ABR), with a BCOD concentration of 30 to 60 mg/L, an ammonium nitrogen concentration of 40 to 70 mg/L, ammonium nitrogen accounting for more than 95% of the total nitrogen concentration, and a treatment scale of about 6400 m$^3$/d.

The structure of the integrated wastewater treatment apparatus is substantially the same as that of Embodiment 1, with the following differences:

The first reactor 11, the second reactor 21, and the third reactor 31 are connected in sequence to form a main body with a cross-sectional inner diameter of about 8 m and a height of about 19 m.

The sizes of the first reactor 11 and the second reactor 21 are the same, with a cross-sectional inner diameter of about 8 m, a height of about 8 m, and a hydraulic retention time of about 2.5 h (calculated based on 60% of the inlet flow).

There are 18 water distribution pipes 16 arranged in three layers, with an inner diameter of about 75 mm, and the flow rate in the pipes is 1.5 to 2.4 m/s.

The volume of the anoxic reaction zone 14 is about 25% of the volume of the first reactor 11.

The nitritation granular sludge filled in the aerobic reaction zone 15 has a concentration of 4000 to 5000 mg/L, a particle size of 0.3 to 1.0 mm, and a bacterial community structure in which aerobic ammonia oxidizing bacteria (Nitrosospira and Nitrosomona) account for about 21%, nitrite oxidizing bacteria (Nitrospira) account for about 1.1%, and symbiotic bacteria related to the formation of granular sludge (mainly Flavobacteriia, Sphingobacteria and Chloroflexi) account for about 77.9%.

The first channel 19-2 and the second channel have a length of about 8 m and a width of 1.6 m.

The inner diameters of the first riser pipe 42 and the second riser pipe 43 are about 200 mm.

The hydraulic retention time in the second reactor 21 is about 1.5 h (calculated based on 100% of the inlet flow).

The filling volume of the anammox biological filler 261 is 75% of the volume of the second reactor 21, the thickness of the biofilm of the MBBR filler is 0.3 to 1.4 mm, and the bacterial community structure is anammox bacteria (Candidatus Brocadia and Kuenenia) accounting for about 11.1%, and symbiotic bacteria related to the formation of biofilm (mainly Chlorobi, Chloroflexi, Anaerolineae and Acidobacteria) accounting for about 88.9%.

The inner diameter of the cylinder of the gas-liquid separator 41 is about 1.0 m, and the height of the gas-liquid separator 41 is about 2.0 m.

The third reactor 31 has a cross-sectional inner diameter of about 8 m, an effective water depth of about 2.7 m, and a hydraulic retention time of about 0.5 h.

The inner diameter of the return pipe 46 is about 300 mm, and the flow meter 47 is arranged about 2 m below the cyclone.

The difference in the specific treatment steps is: 60% of the wastewater to be treated is passed through the first water inlet pipe 12, and the remaining 40% of the wastewater to be treated is passed through the second water inlet pipe 22; the ammonium nitrogen volume load of the aerobic reaction zone 15 is about 0.4 to 0.7 kg $NH_4^+$—$N/(m^3 \cdot d)$; the gas-water mixture in the first riser pipe 42 rises at a flow rate of about 3 to 5 m/s; the total nitrogen volume load in the zone of the anammox biological filler 261 is about 0.8 to 1.4 kg $TN/(m^3 \cdot d)$; the gas-water mixture in the second riser pipe 43 rises at a flow rate of about 2 to 2.5 m/s.

Under the condition of water temperature of 20 to 25° C., by adjusting the aeration intensity of the aerobic reaction zone 15 and the solenoid valves 44 on the riser pipes, the return flow of the return pipe 46 (reading of the flow meter 47) is controlled 1 to 2 times the total water inlet flow of the apparatus, so as to control the residual ammonium nitrogen concentration of the effluent from the end of the reaction zone of the first reactor module 1 to be about 1.0 to 1.5 mg/L, the dissolved oxygen concentration to be about 0.2 to 0.4 mg/L, the pH in solution to be about 7.0 to 7.4, and the free nitrous acid (FNA) concentration to be about 0.01 to 0.04 mg/L.

The results of Embodiment 2 show that the concentrations of $BOD_5$, ammonium nitrogen and total nitrogen in the effluent of the apparatus can be stably below 10 mg/L, 3 mg/L and 8 mg/L, and the water quality meets Class A of the primary standard in "Discharge standard of pollutants for municipal wastewater treatment plant" (GB18918-2002).

The above detailed describes the present disclosure, and it is intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. An integrated wastewater treatment apparatus, wherein, it comprises a first reactor module, a second reactor module of which a lower end is in communication with an upper end of the first reactor module, a sedimentation module of which a lower end is in communication with an upper end of the second reactor module, and a gas-liquid separation module, the first reactor module comprises a first reactor, an anoxic reaction zone located in the first reactor, a denitrification biological filler filled in the anoxic reaction zone, an aerobic reaction zone located in the first reactor and above the anoxic reaction zone, nitritation granular sludge filled in the aerobic reaction zone, a first gas-gathering pressurized layer located in the first reactor and above the aerobic reaction zone, a first water inlet pipe connected with the first reactor and in communication with the anoxic reaction zone, and an aeration device arranged in the aerobic reaction zone; a bacterial community structure of the nitritation granular sludge is: aerobic ammonia oxidizing bacteria account for 10 to 50% of the total number of bacteria, nitrite oxidizing bacteria account for less than 2% of the total number of bacteria, and others are symbiotic bacteria related to a formation of the nitritation granular sludge;

the second reactor module comprises a second reactor connected with the first reactor, a second water inlet pipe connected with a lower portion of the second reactor, an anaerobic reaction zone located in the second reactor, an anammox biological filler filled in the anaerobic reaction zone, and a second gas-gathering pressurized layer located in the second reactor and above the anaerobic reaction zone; the anammox biological filler has a biofilm thickness of 0.2 to 5 mm, and a bacterial community structure of the anammox biological filler is: anammox bacteria account for 5 to 40% of the total number of bacteria, and others are symbiotic bacteria related to the formation of the biofilm;

the sedimentation module comprises a third reactor connected with the second reactor, and a water outlet pipe connected to an upper portion of the third reactor;

the gas-liquid separation module comprises a gas-liquid separator, an exhaust pipe connected with an upper portion of the gas-liquid separator, a first riser pipe of which two ends are respectively in communication with the gas-liquid separator and the first gas-gathering pressurized layer and which passes through the sedimentation module and the second reactor module successively, a second riser pipe of which two ends are respectively in communication with the gas-liquid separator and the second gas-gathering pressurized layer and which passes through the sedimentation module, and a return pipe of which two ends are respectively in communication with a lower portion of the gas-liquid separator and the anoxic reaction zone and which passes through the sedimentation module, the second reactor module, the first gas-gathering pressurized layer and the aerobic reaction zone successively.

2. The integrated wastewater treatment apparatus according to claim 1, wherein, the first reactor module further comprises a partition plate arranged between the anoxic reaction zone and the aerobic reaction zone for separating the anoxic reaction zone and the aerobic reaction zone into independent chambers, and a plurality of water distribution pipes arranged on the partition plate for communicating the anoxic reaction zone and the aerobic reaction zone, and the aeration device is mounted above the partition plate, the partition plate is connected with the first reactor capable of sliding along an up-and-down direction, and the first reactor module further comprises a lock mechanism capable of relatively fixing the partition plate and the first reactor.

3. The integrated wastewater treatment apparatus according to claim 2, wherein, the partition plate is tapered with an apex angle facing upward, and the apex angle is 100 to 120°.

4. The integrated wastewater treatment apparatus according to claim 2, wherein, the water distribution pipes are divided into 2 to 4 layers along a radial direction of the partition plate, and 4 to 8 water distribution pipes are evenly arranged on each layer, the water outlets of the water distribution pipes face the inner wall of the first reactor, and the aeration device comprises an aeration ring arranged at the connection between the first reactor and the partition plate, and a gas inlet pipe connected with the aeration ring and extending out of the first reactor.

5. The integrated wastewater treatment apparatus according to claim 1, wherein, the volume of the anoxic reaction zone is 10 to 30% of the volume of the first reactor; the height of the first gas-gathering pressurized layer is 0.2 to 0.4 times the height of the first reactor and does not exceed 2.5 m; the height of the second gas-gathering pressurized layer is 0.2 to 0.4 times the height of the second reactor and does not exceed 2.5 m; the nitritation granular sludge has a spherical shape with a particle size of 0.3 to 2 mm; the filling volume of the anammox biological filler is 70% to 80% of the volume of the second reactor, and the anammox biological filler is a diagonally suspended porous suspended filler.

6. The integrated wastewater treatment apparatus according to claim 1, wherein, the first gas-gathering pressurized layer comprises first gas-gathering areas located on two sides, and a first channel respectively connected to the first gas-gathering areas on the two sides, the first channel comprises first perforated plates respectively located on two sides and farmed with a plurality of openings, and a first cover plate respectively connected to the upper ends of the two first perforated plates, and the first cover plate is opened with a first hole for the first riser pipe to pass through, and a second hole for the return pipe to pass through; the first gas-gathering areas comprise a plurality of first gas-gathering hoods of which two ends are respectively connected with the first perforated plates and the inner wall of the first reactor, the plurality of first gas-gathering hoods are divided into 3 to 6 layers staggered along the up and down direction, and on each layer is arranged multiple first gas-gathering hoods at intervals;

the second gas-gathering pressurized layer comprises second gas-gathering areas located on two sides, and a second channel respectively connected to the second gas-gathering areas on the two sides, the second channel comprises second perforated plates respectively located on two sides and formed with a plurality of openings, and a second cover plate respectively connected to the upper ends of the two second perforated plates, and the second cover plate is opened with a third hole for the first riser pipe to pass through, a fourth hole for the second riser pipe to pass through, and a fifth hole for the return pipe to pass through; the second gas-gathering areas comprise a plurality of second gas-gathering hoods of which two ends are respectively connected with the second perforated plates and the inner wall of the second reactor, the plurality of second gas-gathering hoods are divided into 3 to 6 layers staggered along the up and down direction, and on each layer is arranged multiple second gas-gathering hoods at intervals.

7. The integrated wastewater treatment apparatus according to claim 6, wherein, the width of the first channel is 0.1 to 0.2 times the diameter of the first gas-gathering pressurized layer, and the width of the second channel is 0.1 to 0.2 times the diameter of the second gas-gathering pressurized layer.

8. The integrated wastewater treatment apparatus according to claim 1, wherein, the second reactor module comprises a support plate arranged in the second reactor and located above the second water inlet pipe, and a mesh cover arranged in the second reactor and located under the second gas-gathering pressurized layer, between the support plate and the mesh cover is formed the anaerobic reaction zone, and the support plate is opened with a sixth hole for the first riser pipe to pass through, and a seventh hole for the return pipe to pass through, and a plurality of water distribution holes.

9. The integrated wastewater treatment apparatus according to claim 1, wherein, the height-to-diameter ratio of the first reactor and the second reactor is independently 1 to 3:1; the aerobic reaction zone is provided with DO, pH and temperature online monitoring probes; the first riser pipe and the second riser pipe respectively comprise a first pipe section extending in an up-down direction, and a second pipe section extending upward from the first pipe section toward the gas-liquid separator, and the angle between the second pipe section and the horizontal plane is 3° to 5°; the gas-liquid separation module further comprises solenoid valves respectively arranged on the first riser pipe and the second riser pipe and located above the sedimentation module, and a flow meter arranged on the return pipe.

10. The integrated wastewater treatment apparatus according to claim 1, wherein, the inner diameters of the first riser pipe and the second riser pipe are independently 0.01 to 0.05 times the inner diameter of the first reactor, and the inner diameters of the first reactor, the second reactor and the third reactor are the same, and the inner diameter of the return pipe is 1.2 to 2 times the inner diameter of the first riser pipe.

11. An integrated wastewater treatment method, wherein, the integrated wastewater treatment method adopts an integrated wastewater treatment apparatus to treat wastewater to be treated,
the integrated wastewater treatment apparatus, comprises a first reactor module, a second reactor module of which a lower end is in communication with an upper end of the first reactor module, a sedimentation module of which a lower end is in communication with an upper end of the second reactor module, and a gas-liquid separation module,
the first reactor module comprises a first reactor, an anoxic reaction zone located in the first reactor, a denitrification biological filler filled in the anoxic reaction zone, an aerobic reaction zone located in the first reactor and above the anoxic reaction zone, nitritation granular sludge filled in the aerobic reaction zone, a first gas-gathering pressurized layer located in the first reactor and above the aerobic reaction zone, a first water inlet pipe connected with the first reactor and in communication with the anoxic reaction zone, and an aeration device arranged in the aerobic reaction zone; a bacterial community structure of the nitritation granular sludge is: aerobic ammonia oxidizing bacteria account for 10 to 50% of the total number of bacteria, nitrite oxidizing bacteria account for less than 2% of the total number of bacteria, and others are symbiotic bacteria related to the formation of the nitritation granular sludge;
the second reactor module comprises a second reactor connected with the first reactor, a second water inlet pipe connected with a lower portion of the second reactor, an anaerobic reaction zone located in the second reactor, an anammox biological filler filled in the anaerobic reaction zone, and a second gas-gathering pressurized layer located in the second reactor and above the anaerobic reaction zone; the anammox biological filler has a biofilm thickness of 0.2 to 5 mm, and a bacterial community structure of the anammox biological filler is: anammox bacteria account for 5 to 40% of the total number of bacteria,
and others are symbiotic bacteria related to a formation of the biofilm;
the sedimentation module comprises a third reactor connected with the second reactor, and a water outlet pipe connected to an upper portion of the third reactor;
the gas-liquid separation module comprises a gas-liquid separator, an exhaust pipe connected with an upper portion of the gas-liquid separator, a first riser pipe of which two ends are respectively in communication with the gas-liquid separator and the first gas-gathering pressurized layer and which passes through the sedimentation module and the second reactor module successively, a second riser pipe of which two ends are respectively in communication with the gas-liquid separator and the second gas-gathering pressurized layer and which passes through the sedimentation module, and a return pipe of which two ends are respectively in communication with a lower portion of the gas-liquid separator and the anoxic reaction zone and which passes through the sedimentation module, the second reactor module, the first gas-gathering pressurized layer and the aerobic reaction zone successively;
passing 55% to 65% of the wastewater to be treated into the anoxic reaction zone through the first water inlet pipe, passing 35% to 45% of the wastewater to be treated into the bottom of the second reactor through the second water inlet pipe, controlling a flow rate of the gas-water mixture in the first riser pipe and the second riser pipe to independently be 2 to 10 m/s, controlling the hydraulic retention time in the third reaction to be 0.5 to 1.5 h, and controlling a flow rate of the return pipe is to be 1 to 8 times a total water inflow rate of the first water inlet pipe and the second water inlet pipe; controlling an ammonium nitrogen concentration of an effluent from the aerobic reaction zone of the first reactor to be not less than 1 mg/L, the dissolved oxygen concentration to be not higher than 0.3 times the ammonium nitrogen concentration, the pH at room temperature to be 7.0 to 7.6, and a free nitrous acid concentration to be not less than 0.01 mg/L.

12. The integrated wastewater treatment method according to claim 11, wherein, the first reactor module further comprises a partition plate arranged between the anoxic reaction zone and the aerobic reaction zone for separating the anoxic reaction zone and the aerobic reaction zone into independent chambers, and a plurality of water distribution pipes arranged on the partition plate for communicating the anoxic reaction zone and the aerobic reaction zone, and the aeration device is mounted above the partition plate, the partition plate is connected with the first reactor capable of sliding along an up-and-down direction, and the first reactor module further comprises a lock mechanism capable of relatively fixing the partition plate and the first reactor, and a flow rate of the water distribution pipes is controlled to be 1 to 3 m/s.

13. The integrated wastewater treatment method according to claim 12, wherein, the partition plate is tapered with an apex angle facing upward, and the apex angle is 100 to 120°.

14. The integrated wastewater treatment method according to claim 12, wherein, the water distribution pipes are divided into 2 to 4 layers along the radial direction of the partition plate, and 4 to 8 water distribution pipes are evenly arranged on each layer, water outlets of the water distribution pipes face the inner wall of the first reactor, and the aeration device comprises an aeration ring arranged at the connection between the first reactor and the partition plate, and a gas inlet pipe connected with the aeration ring and extending out of the first reactor.

15. The integrated wastewater treatment method according to claim 11, wherein, the volume of the anoxic reaction zone is 10 to 30% of the volume of the first reactor; the height of the first gas-gathering pressurized layer is 0.2 to 0.4 times the height of the first reactor and does not exceed 2.5 m; the height of the second gas-gathering pressurized layer is 0.2 to 0.4 times the height of the second reactor and does not exceed 2.5 m; the nitritation granular sludge has a spherical shape with a particle size of 0.3 to 2 mm; the filling volume of the anammox biological filler is 70% to 80% of the volume of the second reactor, and the anammox biological filler is a diagonally suspended porous suspended filler; the height-to-diameter ratio of the first reactor and the second reactor is 1 to 3:1.

16. The integrated wastewater treatment method according to claim 11, wherein, the first gas-gathering pressurized layer comprises first gas-gathering areas located on two sides, and a first channel respectively connected to the first gas-gathering areas on the two sides, the first channel comprises first perforated plates respectively located on two sides and formed with a plurality of openings, and a first cover plate respectively connected to the upper ends of the two first perforated plates, and the first cover plate is opened with a first hole for the first riser pipe to pass through, and a second hole for the return pipe to pass through; the first gas-gathering areas comprises a plurality of first gas-gathering hoods of which two ends are respectively connected with the first perforated plates and the inner wall of the first reactor, the plurality of first gas-gathering hoods are divided into 3 to 6 layers staggered along the up and down direction, and on each layer is arranged multiple first gas-gathering hoods at intervals;

the second gas-gathering pressurized layer comprises second gas-gathering areas located on two sides, and a second channel respectively connected to the second gas-gathering areas on the two sides, the second channel comprises second perforated plates respectively located on two sides and formed with a plurality of openings, and a second cover plate respectively connected to the upper ends of the two second perforated plates, and the second cover plate is opened with a third hole for the first riser pipe to pass through, a fourth hole for the second riser pipe to pass through, and a fifth hole for the return pipe to pass through; the second gas-gathering areas comprises a plurality of second gas-gathering hoods of which two ends are respectively connected with the second perforated plates and the inner wall of the second reactor, the plurality of second gas-gathering hoods are divided into 3 to 6 layers staggered along the up and down direction, and on each layer is arranged multiple second gas-gathering hoods at intervals.

17. The integrated wastewater treatment method according to claim 16, wherein, the width of the first channel is 0.1 to 0.2 times the diameter of the first gas-gathering pressurized layer, and the width of the second channel is 0.1 to 0.2 times the diameter of the second gas-gathering pressurized layer.

18. The integrated wastewater treatment method according to claim 11, wherein, the second reactor module comprises a support plate arranged in the second reactor and located above the second water inlet pipe, and a mesh cover arranged in the second reactor and located under the second gas-gathering pressurized layer, between the support plate and the mesh cover is formed the anaerobic reaction zone, and the support plate is opened with a sixth hole for the first riser pipe to pass through, and a seventh hole for the return pipe to pass through, and a plurality of water distribution holes.

19. The integrated wastewater treatment method according to claim 11, wherein, the aerobic reaction zone is provided with DO, pH and temperature online monitoring probes; the gas-liquid separation module further comprises solenoid valves respectively arranged on the first riser pipe and the second riser pipe and located above the sedimentation module, and a flow meter arranged on the return pipe; the inner diameters of the first riser pipe and the second riser pipe are independently 0.01 to 0.05 times the inner diameter of the first reactor, and the inner diameters of the first reactor, the second reactor and the third reactor are the same, and the inner diameter of the return pipe is 1.2 to 2 times the inner diameter of the first riser pipe; the first riser pipe and the second riser pipe respectively comprise a first pipe section extending in an up-down direction, and a second pipe section extending upward from the first pipe section toward the gas-liquid separator, and the angle between the second pipe section and the horizontal plane is 3° to 5°.

20. The integrated wastewater treatment method according to claim 11, wherein, a concentration ratio of biodegradable organic matter to ammonium nitrogen of the wastewater to be treated is <2:1, and the ammonium nitrogen concentration in the wastewater to be treated is 90% or more of a total nitrogen concentration.

* * * * *